A. H. MACBETH.
ARMOR FOR PNEUMATIC TIRES.
APPLICATION FILED DEC. 30, 1908.
965,642.
Patented July 26, 1910.
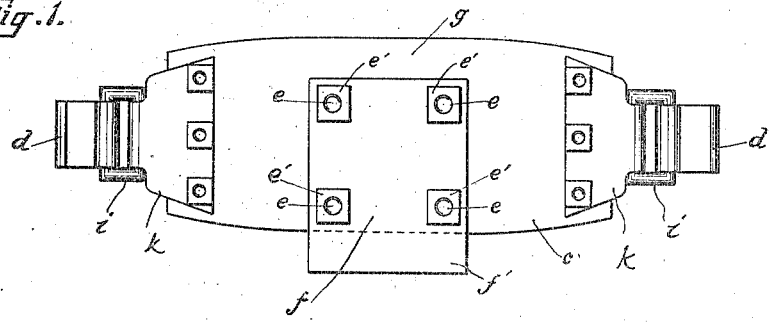
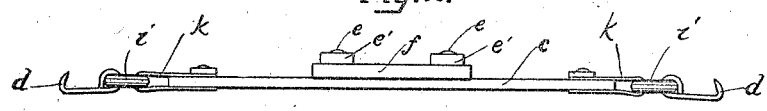
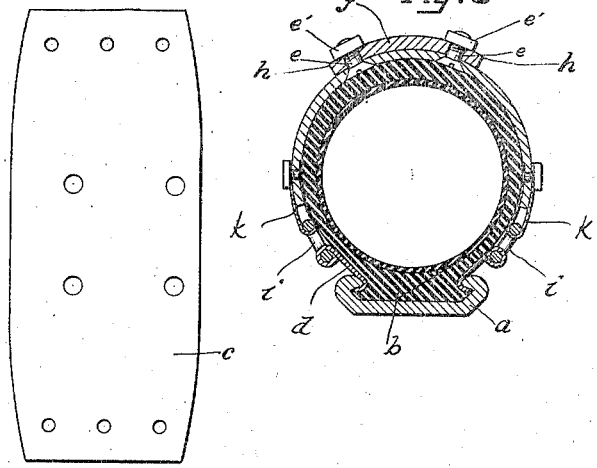
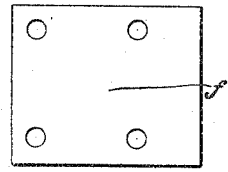
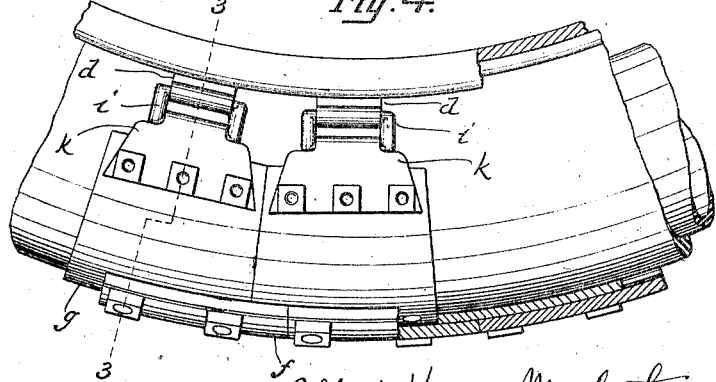
WITNESSES:
J. W. Dickens
W. A. D. Barnhill
Albert Henry Macbeth INVENTOR.
BY Homer C Underwood
ATTORNEY.

UNITED STATES PATENT OFFICE.

ALBERT HENRY MACBETH, OF FORT WAYNE, INDIANA.

ARMOR FOR PNEUMATIC TIRES.

965,642.  Specification of Letters Patent.  Patented July 26, 1910.

Application filed December 30, 1908. Serial No. 469,966.

*To all whom it may concern:*

Be it known that I, ALBERT HENRY MACBETH, a citizen of the United States of America, residing in Fort Wayne, county of Allen, and State of Indiana, have invented certain new and useful Improvements in Armors for Pneumatic Tires, and do declare that the following is a full, clear, and exact description of the invention, which will enable others skilled in the art to which it appertains to make and use the same.

My invention relates to improvements in armors for pneumatic tires, particularly automobile tires, and the invention consists in the construction and combination of elements hereinafter specified and claimed.

Referring to the views of the drawings, Figure 1, is a plan view of one section of the armor-band, with a tread-plate attached, detached from the tire. Fig. 2, is an edge view thereof. Fig. 3, is a cross-section on line 3—3 of Fig. 4, through the armor and rubber tire. Fig. 4, is a view of a portion of the tire-rim and tire with two sections of the armor-band and tread-plates in position thereon. Fig. 5, is a plan view of the armor-band. Fig. 6, is a plan view of the tread-plate.

In the drawings, *a*, designates the usual wheel-rim to which the pneumatic tire, *b*, is secured in the ordinary way.

The armor is made up of a plurality of sections, each section consists of an armor-band, *c*, to the opposite ends of which by any suitable means are secured hooks *d*, which are engaged with the usual annular projections of the wheel-rim. This armor-band, *c*, may be formed of any suitable material, but I preferably use the ordinary rubber belting. The sections may be of any suitable width, but in practice I have found it desirable to make them about three inches in width. To this armor-band is detachably secured, preferably, by means of bolts, *e*, and nuts, *e'*, the tread-plate, *f*, which may be constructed of various materials, but in practice I have found the ordinary rubber belting to be very desirable. This tread-plate is substantially the same width as the armor-band, and is secured thereto in such position that one edge, *f'*, overlaps the edge of the armor-band. In thus securing the tread-plate to the armor-band, there is left at the opposite edge of the armor-band a portion, *g*, which is adapted to receive the overlapping portion, *f'*, of the adjacent tread-plate. By this arrangement, the joints between the sections of the armor-bands and the several sections of the tread-plates, are out of alinement. In other words, the tread-plates and armor-bands, break joints, those parts forming a protective covering for the tire and preventing any possible puncture of the tire.

The tread-plates may be secured to the armor-band by any suitable means as for example by bolts and nuts shown, but the edges of the tread-plates projecting laterally beyond the bolts, are preferably free from the armor-band, whereby they may form a greater catching surface against side-slipping and may yield to lateral pressure. The edges of the tread-plates are preferably cut at right angles to the surface thereof, whereby sharp edges, *h*, are provided. The nuts, *e'*, are preferably squared.

The bolts, *e*, and the nuts, *e'*, are arranged to project from the outer surface of the tread-plate, thus forming both the securing means and an effective part of the anti-slipping means. The projecting parts of the nuts and bolts and the tread-plate, effectively prevent the tire from slipping in any direction. This would be true of any form of projecting bolt or rivet, but I preferably use the squared nut and cut the edges of the tread-plate at right angles to its surface whereby more or less sharp contact points are presented for contact with the road-surface.

In assembling the armor on the tire, the tire is first deflated, the hooks, *d*, are placed in position to engage the wheel rim, after which the tire is inflated. Upon inflation the tire expands against the armor-band. By this construction, in the event that the tire becomes weakened at any point, the tendency to outward expansion at such point beyond the adjacent stronger portions of the tire is overcome, and the life of the tire is very materially lengthened.

Having described my invention, what I claim is,

1. An armor for pneumatic tires comprising a series of separate and independent flexible armor band sections, means for securing the ends of the respective sections to the rim of the wheel, a flexible tread plate secured to each section and overlapping the adjacent section over substantially the entire width of tread surface, whereby the joints between the sections at the tread surface are protected from puncture.

2. An armor for pneumatic tires consisting of a series of separate and independent flexible armor band sections, a hook secured to each end of said armor band sections and adapted to engage the rim of the wheel, a flexible tread plate on each section of substantially the same length as the width of an armor band section, arranged to overlap one edge thereof and be free of the other edge a distance corresponding to the width of the overlapping section of the next tread plate, bolts extending through the tread plate and beyond the nuts, and nuts secured to the bolts for detachably securing the tread plate to the armor band section and form an irregular exterior surface.

In testimony whereof I have signed my name to this specification in the presence of two subscribing witnesses.

ALBERT HENRY MACBETH.

Witnesses:
H. C. UNDERWOOD,
CHARLES S. OLBERTSON.